United States Patent [19]
Kuntz

[11] 3,719,842
[45] March 6, 1973

[54] SYNCHRONOUS MOTOR
[75] Inventor: Kenneth C. Kuntz, Indianapolis, Ind.
[73] Assignee: P. R. Mallory & Co., Inc., Indianapolis, Ind.
[22] Filed: May 28, 1971
[21] Appl. No.: 148,004

[52] U.S. Cl. ................................. 310/164, 310/41
[51] Int. Cl. .......................................... H02k 21/08
[58] Field of Search ..................... 310/41, 162–164, 310/257, 156 A, 49

[56] References Cited

UNITED STATES PATENTS

| 3,231,770 | 1/1966 | Hyde | 310/41 X |
| 3,350,589 | 10/1967 | Suarnias | 310/41 |
| 3,524,091 | 8/1970 | Suzoki et al. | 310/162 |

FOREIGN PATENTS OR APPLICATIONS

| 388,739 | 2/1933 | Great Britain | 310/164 |
| 876,576 | 9/1961 | Great Britain | 310/164 |

Primary Examiner—D. F. Duggan
Attorney—Richard H. Childress, Robert F. Meyer and Henry W. Cummings

[57] ABSTRACT

A self!-starting synchronous motor includes cooperating shells each providing a plurality of stator poles projecting into an aperture of a field coil providing a stator pole assembly adjacent to poles of a rotor of a synchronous motor, the stator poles being intermeshed to define a circle. The intermeshed stator poles provide a stator arrangement which is asymmetrical for surer starting and alternate flux at individual poles for higher torque. The rotor includes a magnet of a relatively high energy product partial oriented ceramic with individual poles impressed on its periphery. The motor directional system stops the motor from a wrong way directional rotation at a point of high oscillation.

10 Claims, 4 Drawing Figures

*INVENTOR.*
KENNETH C. KUNTZ
BY Robert Meyer
ATTORNEY

INVENTOR.
KENNETH C. KUNTZ
BY Robert Meyer
ATTORNEY

SYNCHRONOUS MOTOR

The present invention relates to synchronous motors; and more particularly, to a synchronous motor having a stator pole arrangement which in combination with the rotor of the motor provides high torque and good starting characteristics for the motor.

There are a multitude of applications for small synchronous motors of the type having a permanent magnet rotor. Many of these applications are in timing devices such as clocks, and appliances such as washers and dryers which utilize time sequence switches. In the future, these timing devices will have to be made smaller than present-day timing devices. Hence, the synchronous timing motor will have to be made smaller, particularly "thinner." This does not mean, however, that the motors can be made smaller or "thinner" with a subsequent loss of torque or good starting characteristics. To the contrary, it is a prime goal of the manufacturers and users of synchronous motors to provide such motors having a high torque with good starting characteristics. This is particularly true in those timing devices which require rapid advance means and employ a synchronous motor as part of the rapid advance means.

The present invention is concerned with a synchronous motor and has as an object the provision of a synchronous motor which is relatively small in size but high in torque.

Another object of the invention is to provide such a motor having good starting characteristics.

A further object of the invention is to provide a synchronous motor having a high torque and good starting characteristics through the combination of a high torque rotor and the arrangement of its stator poles.

Yet another object of the invention is the provision of a synchronous motor having asymmetricals stator pole arranagement there being no axis through the stator assembly about which there would be a mirror image of the pole arrangement.

Another object of the invention is to provide a synchronous motor having a higher torque achieved from stator poles of alternating flux polarity.

Still another object of the invention is to provide such a synchronous motor having a permanent magnet rotor fabricated from a material of a relatively high energy product partial oriented ceramic.

Another object of the invention is the provision of a synchronous motor having a permanent magnet rotor which includes a support means for the magnet and a cam for a directional means.

Another object of the invention is to provide such a synchronous motor having a directional system which will stop a wrong-way directional rotation of the rotor at a point of high oscillation so that it may be easily started in the opposite direction.

These and other objects of the invention will become apparent from the following description taken in conjunction with the accompanying drawings wherein.

Figure 1:
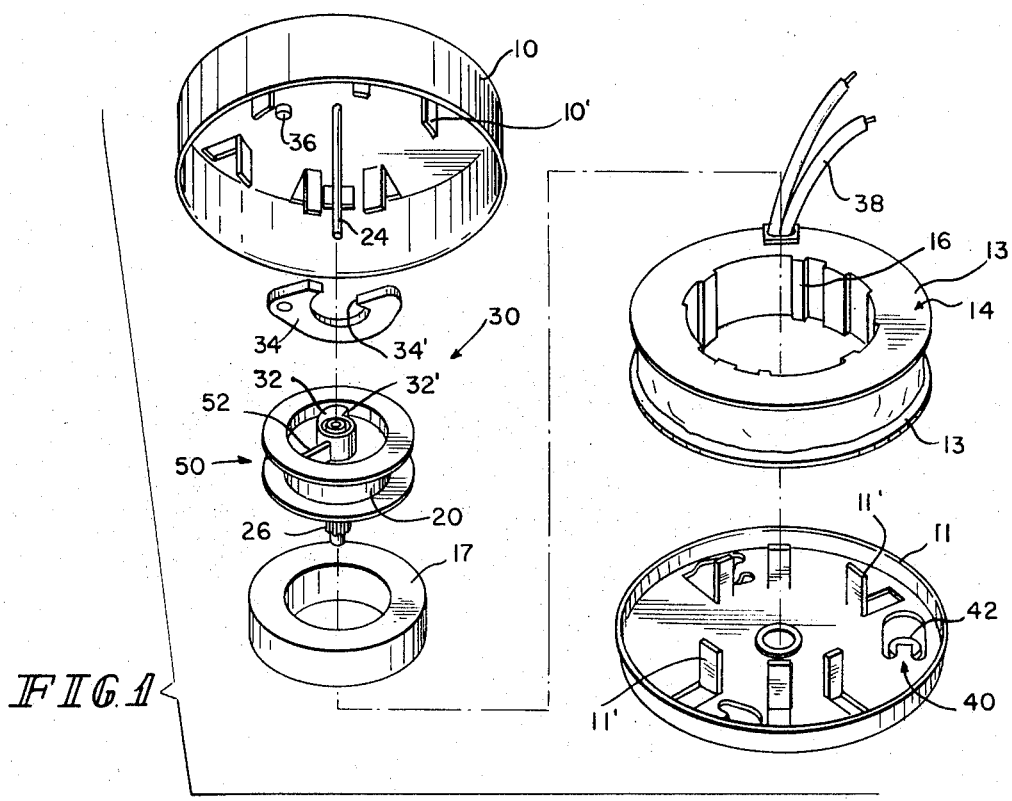
FIG. 1 is an exploded view of the motor.
Figure 2:
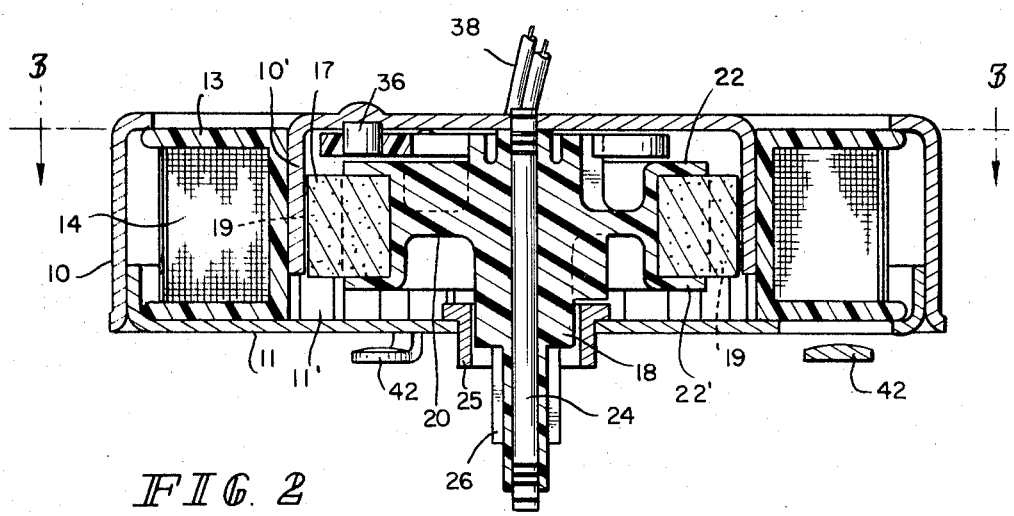
FIG. 2 is a section of the motor taken in elevation.

Generally speaking, the objects of the invention are accomplished by providing a self-starting synchronous motor having an apertured field coil, a rotor including a permanent magnet positioned in the aperture of the field coil, a plurality of poles about the periphery of the permanent magnet, alternate poles being of one flux polarity and the remaining poles being of the opposite flux polarity so as to provide a permanent magnet rotor, and a stator assembly including cooperating shells each having stator poles projecting into the aperture of the field coil and adjacent the rotor poles so as to be individually intermeshed and forming a circle. The stator arrangement is asymmetrical and provides alternate flux at individual poles. A directional system stops the rotor from a wrong-way directional rotation at a point of high oscillation.

Referring now to the drawings the component parts of the present invention can be visualized. The motor of the present invention is retained in a top shell 10 and a bottom shell 11 which are held together to form a housing. The material for the shells 10 and 11 may be ordinary cold-rolled steel preferably annealed. Integral poles 10' and 11' are formed by lancing radial strips out of the flat protions of the respective shells and forming them parallel to the center axis. The poles that are formed in the shells constitute stator field poles and when intermeshed provide a stator assembly for the motor of the present invention.

A coil 14 which includes an insulated spool wound with a predetermined number of turns of wire is annularly disposed in the space between the ID of the shells 10 and 11 and the intermeshed stator poles 10' and 11' defining a circle. The wire is wound on a bobbin 13 which also includes a plurality of ribs or splines 16 used to position the stator poles in a predetermined position.

The rotor of the synchronous motor includes a permanent magnet material in the shape of a ring 17 carried by a hub 18, the hub 18 including a flange 20 having rims 22 and 22' extending therefrom. The permanent magnet material includes a material of a relatively high energy product partial oriented ceramic such as a barium ferrite ceramic magnet with its outer periphery being impressed or magnetized into separate pole segments 19 of alternate north and south polarity. The permanent magnet material preferably has an energy product of at least $1.4 \times 10^6$ gauss oersteds, and has a relatively large diameter to thickness ratio (about 4 to 1) to provide a high torque in a thin package. A suitable material for the magnet could be a material manufactured by Stackpole Carbon Co. and designated Stackpole A-20, for example. As shown, the hub 18 is carried by an axle 24 which is rigidly held to the top shell 10. Hub 18 is free to rotate about the axle within sleeve 25. An output pinion 26 is formed as part of the hub 18. The hub 18 including the flange 20 and rims 22 and 22' are fabricated from a suitable plastic such as acetal, for example. During fabrication, the shrink in the plastic squeezes the magnet 17 such that the magnet is captured and held from rotating with respect to the rotor, particularly by the rims 22 and 22'. It should be understood that the magnet ring 17 is shown separated from hub 18 in the exploded view for purposes of clarity, and that in use the ring 17 is molded onto the hub.

The motor also includes a one-way directional means 30. One-way directional means 30 includes a member 32 in the shape of a cam carried by the rotor hub 18 and a restraining member in the form of a pawl 34 pivotally carried about post 36 which is fixedly carried by the shell 10. Pawl 34 cooperates with cam 32 to stop the motor from a wrong-way directional travel as will be hereinafter described.

Electrical leads 38 enable the coil 14 to be connected to a suitable AC power source.

There is also provided in the present motor a means 40 for permitting a casing of a speed reduction means to be attached to the motor. Such means 40 includes tabs 42 lanced from the lower shell 11, the tabs engaging apertures in the housing or casing (not shown) carrying the speed reduction means.

The arrangement of the stator poles, both in location and spacing, of the present motor aids in providing good starting characteristics and high running torque. With the present stator arrangement, in combination with the use of a permanent magnet of a material of a relatively high energy product partial oriented ceramic having distinct poles impressed around its periphery, both high torque and good starting characteristics are achieved, even though the motor is relatively small or thin. With respect to the stator assembly, the present stator arrangement provides asymmetry which is desirable for self-starting and at the same time the arrangement provides alternating flux characteristics at individual poles to provide the high running torque. The asymmetry is such that it can be characterized in that there is no axis through the stator assembly about which there would be a mirror image of the pole arrangement.

Figure 4:
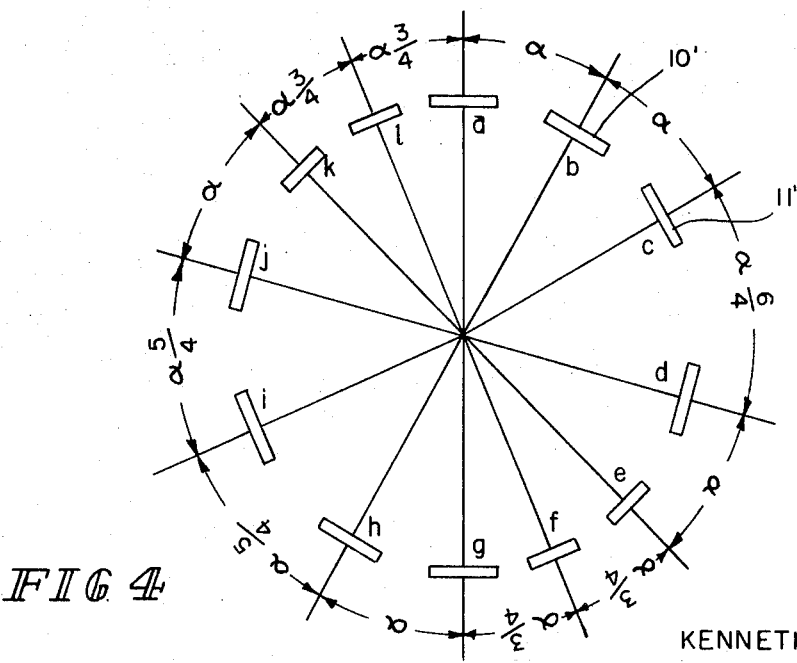
FIG. 4 is a schematic diagram of the stator pole arrangement.

Referring particularly to FIG. 4, the stator assembly is schematically depicted. The poles 10' and 11' projecting from the shells 10 and 11 (FIG. 1) are intermeshed with each other to form a circle with a pole from one shell adjacent to two other poles from the other shell. The poles are thus intermeshed with each other so that the stator flux alternates every other pole. When assembled the stator poles are spaced from each other such that a high degree of asymmetry is achieved without substantially any loss of running torque. The number and arrangement of the stator poles is dependent upon the number of rotor poles. The number of rotor poles is determined by the desired speed of the motor. For example, with 12 rotor poles, the motor will have a speed of 600 rpm at 60 hz. The number of rotor poles define the pole pitch angle $\alpha$ which may be defined as $360°/n$, wherein $n$ is the number of rotor poles. For optimum dynamic performance, there should be the same number of stator poles as there are rotor poles, with the rotor poles spaced $\alpha$ degrees apart. However, in order to insure that the motor will always start, or, to put it another way, to provide positive starting, some asymmetrical deviation is desired in the spacing of the stator poles. In the present arrangement, there are nine poles in five pairs wherein the angle between the poles of each pair equals $\alpha$: pairs $a-b, b-c, d-e, g-h$ and $j-k$. Pairs $k-l, l-a, e-f,$ and $f-g$ are spaced such that the angular distance between them is $\frac{3}{4} \alpha$. Pairs $h-i$ and $i-j$ are five-fourths $\alpha$ apart while pair $e-d$ is six-fourths $\alpha$ apart.

It is apparent that vertical angles are formed between $jk-ed; kl-fe; la-gf;$ and $ab-hg$. Except for pole $c$ being offset by one-fourth $\alpha$, poles $bc-hi$ and $cd-ij$ would also form vertical angles. Thus there is no axis about which there would be a mirror image of the pole arrangement. Pole $c$ is offset by one-fourth $\alpha$ in order to provide additional asymmetry to aid in providing good starting capability for the motor.

In operation, when an AC current is applied to the coil 14, the rotor of the motor will begin to rotate due to the magnetic flux paths generated between the rotor poles and the stator poles, the starting of the rotor being initiated by the asymmetrical arrangement of the stator poles. Once the rotor is turning, a high running torque will be achieved through the combination of the rotor structure with its magnet of a material of relatively high energy product partial ceramic and strong distinct poles, and the stator arrangement which provides alternating flux characteristics at individual poles. Using a field coil of approximately 5,200 turns of 41 AWG copper wire, a motor of approximately 2-inch diameter and a thickness of 0.50 inches achieved a running torque of about 400 in-oz. at a line voltage of 115 VAC at 1 r.p.m.

Figure 3:
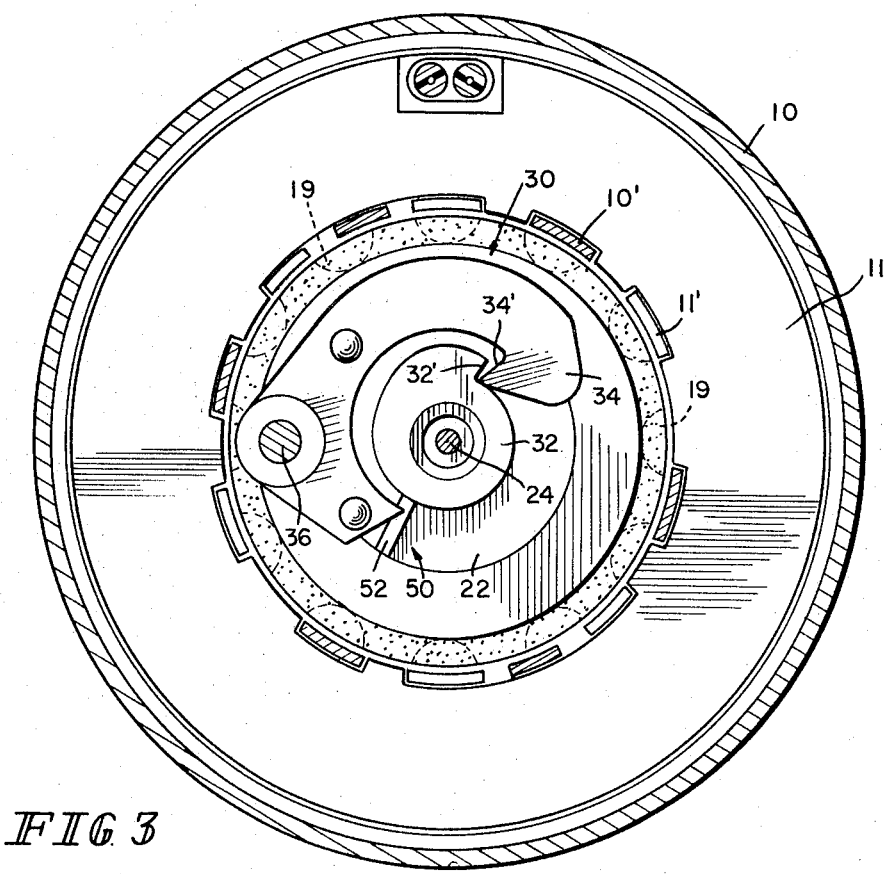
FIG. 3 is a view taken along the line 3—3 of FIG. 2.

The rotor may, however, start in the wrong direction. When this occurs, the directional means 30 will stop the motor and start the rotor in the right direction. This can best be seen in FIG. 3. Referring to FIG. 3, the directional means 30 is arranged to provide continuous running in a counterclockwise direction. When the rotor is running in this direction, cam 32 will bias pawl 34 outward and permit the rotor to run. If the rotor starts to turn clockwise the steps 32' of the cam will engage step 34' of the pawl to stop the rotor and additionally cause it to rebound and start in the right direction.

In order to insure that the rotor will rebound and start in the right direction when the pawl 34 engages the cam, the rotor should be stopped from its wrong way directional rotation at a point of high oscillation, or that point where the attraction between the poles in unequal. The point is characterized by high vibration of the motor. Thus the step 32' of the cam should engage the step 34' (FIG. 3) of the pawl at a point of high oscillation in the rotor's rotation. In order to insure that the magnet 17 will be properly oriented on the hub 18 such that the cam engages the pawl at a point of high oscillation, there is provided a locating means 50. Locating means 50 includes a web 52 carried on the flange 20 of the rotor, the web being oriented with respect to the face 32' of cam 32. Using locating means 50, the permanent magnet 17 may be properly located on the flange 20 by relating a pole of the magnet with respect to the web 52.

What is claimed is:
1. In a self-starting synchronous motor,
   a. an apertured field coil,
   b. a rotor including a permanent magnet positioned in said aperture of said field coil, a plurality of poles about the periphery of said permanent magnet, alternate poles being of one polarity and the remaining poles being of the opposite polarity so as to provide a permanent magnet rotor, and
   c. a stator assembly including first and second shells having stator poles projecting into said aperture and adjacent said poles about the periphery of said magnet, said stator poles intermeshed with each other to form a circle, the arrangement of said poles being asymmetrical with no axis through said stator assembly about which there would be a mirror image of said pole arrangement a majority of said stator poles spaced $\alpha$ degrees apart from each other, wherein $\alpha$ is equal to $360/n$, and $n$ equals the number of rotor poles.

2. In a self-starting synchronous motor according to claim 1 wherein there are nine of said poles in five pairs spaced $\alpha$ degrees apart.

3. In a self-starting synchronous motor according to claim 2 wherein eight of said nine poles form two vertical angles of $\alpha$ degrees.

4. In a self-starting synchronous motor according to claim 1 wherein all of said stator poles are spaced at multiples of one-fourth $\alpha$, wherein $\alpha$ is equal to $360/n$, and $n$ equals the number of rotor poles.

5. In a self-starting synchronous motor according to claim 4 wherein there are five stator poles spacings of $\alpha$, four of three-fourths $\alpha$, two of five-fourths $\alpha$, and one of six-fourths $\alpha$.

6. In a self-starting synchronous motor according to claim 1 wherein said permanent magnet includes a substantially flat circular material of relatively high energy product partial oriented ceramic and said poles are impressed upon the outer diameter of said flat circular material.

7. In a self-starting synchronous motor according to claim 6 wherein said rotor further includes a hub, a flange extending from said hub, said flange including at least one outer rim extending from said flange, and wherein said substantially flat material is a ring carried by said flange and said rim.

8. In a self-starting synchronous motor according to claim 6 wherein said permanent magnet is a ring having an outer diameter to thickness ratio of at least 4 to 1.

9. In a self-starting synchronous motor according to claim 1 further including a one-way directional means, including a member carried by said rotor and restraining means cooperating with said member to stop said rotor from a wrong way directional rotation and causing said rotor to rotate in a predetermined direction.

10. In a self-starting synchronous motor according to claim 9 further including locating means orienting at least one pole of said rotor with respect to said member so as to permit said restraining means to engage said member at a point of high oscillation.

* * * * *